United States Patent Office 3,460,986
Patented Aug. 12, 1969

3,460,986
ACTIVATION OF PHOSPHOR FILMS
Walter J. Harper, Wilkinsburg, Pittsburgh, Pa., and Edward J. Ham, Rockaway Township, White Meadow Lake, N.J., assignors to Westinghouse Electric Corporation, Pittsburgh, Pa., a corporation of Pennsylvania
Continuation of application Ser. No. 413,113, Nov. 23, 1964. This application May 15, 1968, Ser. No. 731,669
Int. Cl. B44d 1/18; C09k 1/12; C23c 13/04
U.S. Cl. 117—215                                    8 Claims

ABSTRACT OF THE DISCLOSURE

A method of activating an electroluminescent phosphor matrix film by placing the film in closely spaced relationship with respect to a powder of the phosphor, and then heating same. A preferred film thickness, spacing distance, means for spacing the material, and preferred firing conditions are specified for a zinc sulfide film.

---

The present application is a continuation of application Ser. No. 413,113, filed Nov. 23, 1964, now abandoned.

This invention relates to the activation of phosphor matrix materials and in particular relates to the activation of phosphor matrix films to be used in electroluminescent devices.

Heretofore, electroluminescent films have been formed as disclosed in Thornton U.S. Patent No. 3,044,902, by evaporating a film of phosphor matrix material onto a suitable substrate. The substrate is then embedded in an activated electroluminescent phosphor powder allowing the evaporated film to come into contact with the powder. While remaining in contact, the film and powder are heat treated. The activators in the phosphor powder enter and activate the film. The treated film is brightly electroluminescent.

This prior art method of forming electroluminescent films has several drawbacks. It is desirable to have an even more intense light output at a lower electric field. Also, the films produced by this method may be frosty, which lowers and diffuses the light transmission.

It is, therefore, an object of this invention to provide an improved method of forming electroluminescent films.

Another object of this invention is to provide a method of forming electroluminescent films which yield more light at a lower voltage than heretofore possible.

A further object of this invention is to provide a method of forming an electroluminescent film which is optically very clear.

Briefly, these and other objects are achieved by forming a layer or thin film of phosphor matrix material on a suitable substrate, as disclosed in the aforementioned Thornton patent. The film is then surrounded with electroluminescent phosphor powder, but the film is not in contact with the phosphor powder. Rather a space is left between the film and the surrounding powder. The resulting and spaced powder are then heat treated to activate the film.

Figure 1:
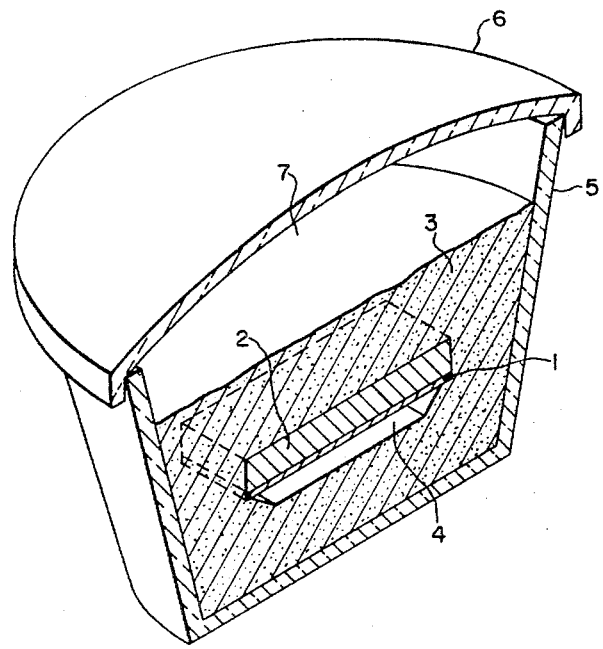
Figure 2:
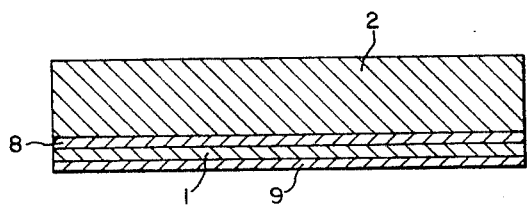

For a better understanding of the invention, reference should be had to the accompanying drawings including:

FIG. 1 which shows a sectional perspective view of the film activation step; and FIG. 2 which shows a cross-sectional view of the activated film included between spaced electrodes.

Referring specifically to FIG. 1, an unactivated phosphor matrix film 1 has been deposited on a substrate 2. The matrix film 1 and substrate 2 are embedded in an activated electroluminescent phosphor powder 3 and a space 4 is provided between matrix film 1 and phosphor powder 3. The phosphor powder 3 is contained in a silica crucible 5 with a cover 6. An inert atmosphere such as nitrogen gas is preferably provided in the overhead space 7.

The exact mechanism of activation during the heat treating is not clearly understood. Apparently the activators in the phosphor powder 3 form a vapor containing the activators in the proper concentration, which vapor enters space 4 and is absorbed by the matrix film 1. The electroluminescent films produced by the present method are very responsive to both alternating and unidirectional electric fields, as are the films produced in accordance with the aforementioned Thornton patent. However, the present films provide a more intense light at lower voltages. Also the films produced by the present method are optically very clear, whereas the films of the prior art often have a frosty appearance.

Any film or activated phosphor powder may be used, although a film comprising zinc sulfide and zinc sulfide phosphor powder are preferred. The zinc sulfide matrix is evaporated onto a glass substrate to form the matrix film 1. The glass selected for this purpose will not sag during the subsequent heat treatment. Also, the coefficient of thermal expansion of the selected glass is desirably similar to that of zinc sulfide. Such glasses are well known. Other vitreous and inorganic materials may be used providing they can withstand the 750° C. temperature of the heat treatment.

The initial evaporation process of the matrix film 1 is described in detail in the aforementioned Thornton patent and is outlined briefly as follows. The surface of the substrate 2 is cleaned. The substrate 2 is mounted in a vacuum with a metallic boat containing the matrix material which is to be evaporated onto the substrate 2. The boat and contents are heated by an electric current which vaporizes the contents. The vapor leaves the boat and condenses on the substrate 2. In order to get a uniform deposit the substrate 2 may be rotated slowly. The bombardment of the substrate 2 by the vaporizing contents of the boat may be prevented by providing a baffle between the boat and substrate 2. The evaporation is continued until the film has a thickness of approximately two microns which can be readily determined by orders of interference patterns. This film thickness is given only as an example and may be varied considerably.

The substrate 2 with matrix film 1 is then placed in a bed of activated electroluminescent phosphor powder 3 contained in the silica crucible 5. The bed is provided with a space 4 that prevents the matrix film 1 from contacting the phosphor powder 3. A four mil space yields the highest light output at low voltages. However, the advantageous effects of the spacing can be noticed anywhere from about 1 to 20 mils. The preferred spacing is from 1 to 10 mils, with optimum low-voltage-excitation brightness achieved with a spacing of about 4 mils. More of the phosphor powder 3 is desirably placed over the substrate 2, completely enclosing it. The substrate 2 and matrix film 1 are now ready for heat treating.

The heat treating consists of raising the temperature of matrix film 1 and activated phosphor powder 3 to approximately 750° C. for approximately thirty minutes. The preferred glass used tends to soften at temperatures appreciably higher than 750° C. After heat treating the matrix film 1 is sodium cyanide washed to remove excess copper deposited on there by the phosphor powder 3 during the heat treating. The temperature used in heat treating may be varied considerably, as described in the aforementioned Thornton patent. In the case of copper-activated zinc sulfide electroluminescent phosphor, the usual firing temperatures are from about 800 to 1100° C. When firing the thin films of zinc sulfide matrix having the preselected zinc sulfide phosphor powder packed thereabout, the firing temperature should be at least about 700° C. and it is preferred to use a firing temperature of about 750° C. If the substrate is not adequately supported during the film firing step, the film firing temperature should be less than the softening temperature of the substrate. Also, various matrix films and activating substances therefor may be used as described in the patent to Thornton. Other known washing materials can be used in place of the preferred sodium cyanide solution wash, as also disclosed in the patent to Thornton.

The depth and uniformity of space 4 affects the character of the activated film. The following table, designated as Table I, is a tabulation of experimental results found for various depths of space 4. The transparency appears to become better as the depth increases. The breakdown voltage of the activated film is quite good for "zero" depth of the depression 4, decreases somewhat as the depth increases to about 4 mils, and attains a very high value as the depth is increased to 10 mils. The light output at each breakdown voltage increased in this series of films as the depth increased. The brightness of the electroluminescence at the relatively low 30 volt level was over 20 times as bright when a 4 mil space was used than when the phosphor powder was in contact with the film.

TABLE I

|  | Depth of Depression | | |
| --- | --- | --- | --- |
|  | 0 Mil | 4 Mil | 10 Mil |
| Transparency | (1) | (2) | (3) |
| Breakdown voltage, volts | 62 | 35 | 132 |
| L at breakdown, ft.-l | 23.0 | 70.0 | 300.0 |
| Brightness in ft.-l. at 30 v.—400 c.p.s. | 1.40 | 34.0 | 0.35 |
| Film thickness | 2.00μ films with .08μ film of Ucilon | | |

1 Frosty.  2 Clear.  3 Very clear.

If the depth of space 4 is not uniform, the properties discussed above will not be uniform over the area of the activated film. To establish and maintain the uniform depth a spacer may be employed. Three types of spacers serve as examples. The first type is a washer spacer made of a material having a high melting point and which will not react with the phosphor powder or activator. Platinum or molybdenum washers have been successfully employed. This spacer supports the film and substrate around the edges of the area to be activated and allows access to this area for the activators in phosphor powder 3. The second type of spacer is a depression in the bed of activated powder. A depression of the correct shape and depth is made in phosphor powder 3 by a form which is removed before the film is heat treated. A third type of spacer is an inactive, refractory, fibrous material such as quartz cloth. This spacer forms a depression of the correct shape and depth and remains in place during the heat treating. The fibrous nature of the cloth allows the activators to migrate therethrough and enter film 1.

Referring now to FIG. 2, to facilitate applying an electric field which produces the electroluminescence in the now activated film 1, conductive coatings or films of tin oxide 8 and 9 are employed. The tin oxide coatings are located on both sides of the activated film 1 as shown in FIG. 2 and act as electrodes. The electrode 8 between the substrate 2 and matrix film 1 must be evaporated onto the substrate 2 prior to the evaporation of matrix film 1. Electrode 8 is referred to as the base film. After the matrix film 1 has been evaporated and activated, tin oxide electrode 9 is evaporated over the activated matrix film 2. The electrode 9 is referred to as the cover film and functions as the second electrode. One of the electrodes 8 and 9 must be light transmitting and therefore very thin. Normally the base film is made light transmitting because of the ease of formation on the substrate 2. The cover film 9 can be relatively thick and opaque, such as a vacuum-metallized aluminum layer. Other conducting materials can be used for these electrodes. Tin oxide is preferred for the light-transmitting electrode because of its high conductivity which is necessary in order for the thin light transmitting film to be functional. It is desirable for the cover electrode to have reflective properties and for this reason aluminum is frequently used.

It will be recognized that the object of the invention has been achieved by providing an improved method for making an electroluminescent film which is more sensitive to an electric field applied thereacross. The electroluminescent film produced by this method is optically clear and very adapted to light transmission.

We claim:

1. The method of forming on a substrate a thin light-transmitting film of preselected activated electroluminescent phosphor comprising a matrix and activator, said method comprising:
    (a) evaporating onto said substrate a thin film layer of said matrix of said preselected electroluminescent phosphor;
    (b) surrounding said matrix film layer with powder of said preselected activated electroluminescent phosphor, and uniformly separating the exposed surface of said matrix film layer from the nearest of said surrounding phosphor powder by from about 1 mil to 20 mils;
    (c) heating said matrix layer and said surrounding prosphor powder at a predetermined temperature and for a predetermined time to cause said matrix layer to absorb said activator and form said film of said preselected activated electroluminescent phosphor.

2. The method as specified in claim 1, wherein said film of activated electroluminescent phosphor is thereafter washed with solvent after heating to remove excess activator from the surface thereof.

3. The method as specified in claim 1, wherein said substrate is glass having a light-transmitting, electrically conducting layer formed thereon.

4. The method as specified in claim 1, wherein the said matrix film layer is uniformly separated from said surrounding phosphor powder by a fibrous quartz spacer.

5. The method as specified in claim 1, wherein said matrix is zinc sulfide and said activator is copper.

6. The method as specified in claim 5, wherein said spacing is about 4 mils.

7. The method as specified in claim 5, wherein said heating is at a temperature of from at least 700° C. to a temperature which is less than the softening temperature of said substrate.

8. The method as specified in claim 5, wherein said heating is at about 750° C. for 30 minutes.

References Cited

UNITED STATES PATENTS

| 2,600,579 | 6/1952 | Ruedy et al. | |
| 2,721,950 | 10/1955 | Piper et al. | |
| 2,867,541 | 1/1959 | Coghill et al. | 117—106 |
| 3,044,902 | 7/1962 | Thornton | 117—215 |
| 3,113,040 | 12/1963 | Winston. | |

ALFRED L. LEAVITT, Primary Examiner

A. GOLIAN, Assistant Examiner

U.S. Cl. X.R.

117—33, 106, 211; 313—108